United States Patent [19]

Andruchiw

[11] 4,109,740

[45] Aug. 29, 1978

[54] STAIR CLIMBING DEVICE

[75] Inventor: Roman Andruchiw, Willowdale, Canada

[73] Assignee: Step-Rite Limited, Willowdale, Canada

[21] Appl. No.: 805,290

[22] Filed: Jun. 10, 1977

Related U.S. Application Data

[63] Continuation-in-part of Ser. No. 686,270, May 14, 1976, abandoned.

[30] Foreign Application Priority Data

May 22, 1975 [CA] Canada .................................. 227504

[51] Int. Cl.² .............................................. B62B 5/02
[52] U.S. Cl. ..................... 180/8 A; 188/4 R; 188/23; 188/74; 280/5.22; 280/DIG. 10
[58] Field of Search .............. 180/8 A, 9.22; 280/5.2, 280/5.22, 5.26, 5.28, 47.27, 242 WC, DIG. 10; 188/22, 23, 4, 74; 16/18 B

[56] References Cited

U.S. PATENT DOCUMENTS

| 774,664 | 11/1904 | Harrington | 188/23 |
|---|---|---|---|
| 3,362,496 | 1/1968 | Landry | 180/9.22 |
| 3,377,081 | 4/1968 | Ude | 280/47.27 |
| 3,515,401 | 6/1970 | Gross | 180/8 A X |
| 3,827,718 | 8/1974 | Curry | 280/242 WC |

*Primary Examiner*—Robert R. Song
*Assistant Examiner*—R. Schrecengost
*Attorney, Agent, or Firm*—James T. Wilbur

[57] ABSTRACT

The stair-climbing device is suitable for transporting a load up or down a flight of steps. The device includes a frame on which the load is seated and a number of load-bearing shoes which engage successive steps in the flight of steps to produce displacement of the device along the flight of steps. The shoes are pivotally connected to sprocket chains which are activated by a reversible electric motor. An arm is pivotally connected to the frame and is provided with a sensing head disposed forward of wheels on which the device rolls. As the device rolls forward on the tread of a step, the sensing head contacts the tread until it is beyond the forward edge whereupon the head falls with resulting pivotal movement of the arm. The arm is further provided with a downwardly facing friction surface which is spaced above the tread when the sensing head is in contact therewith and which descends into contact with the tread when the arm pivots and thereby frictionally retards further forward movement of the device on the tread.

12 Claims, 14 Drawing Figures

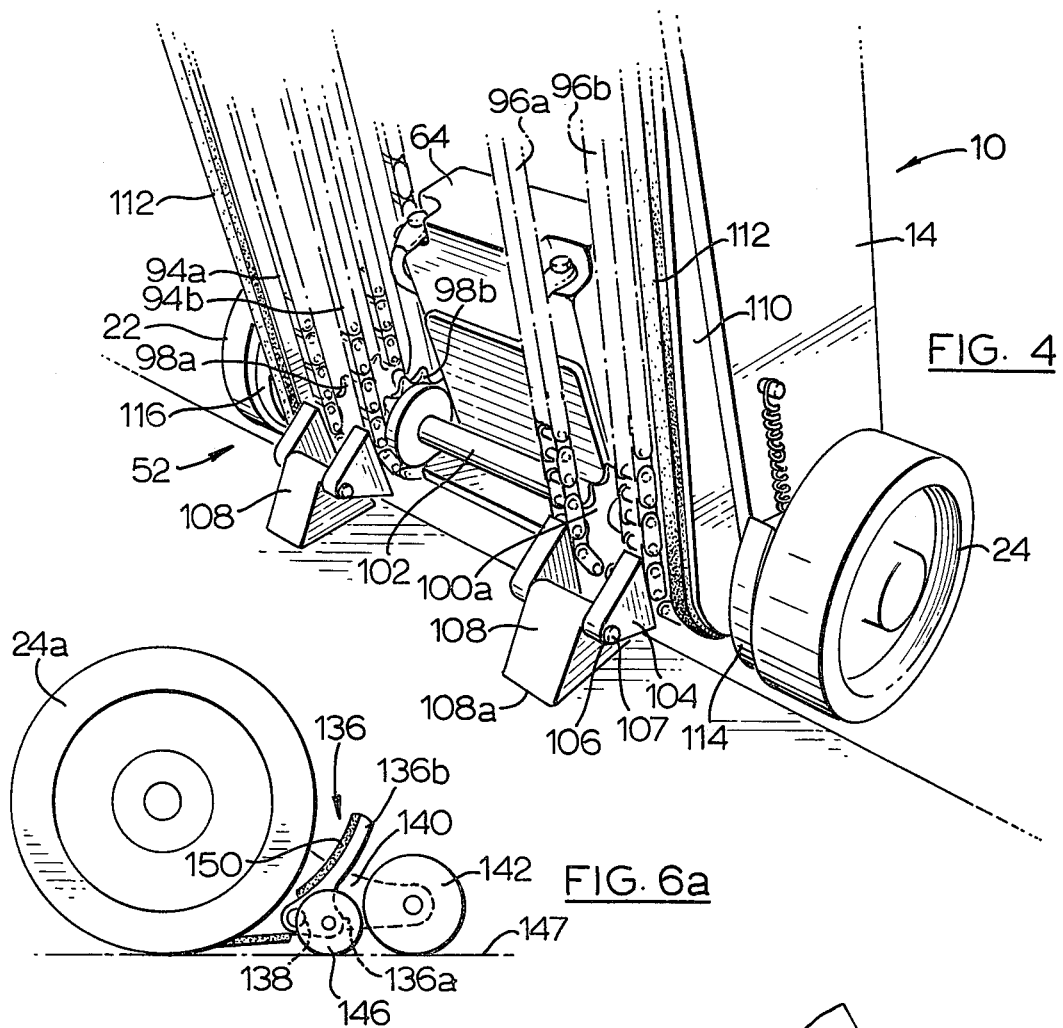
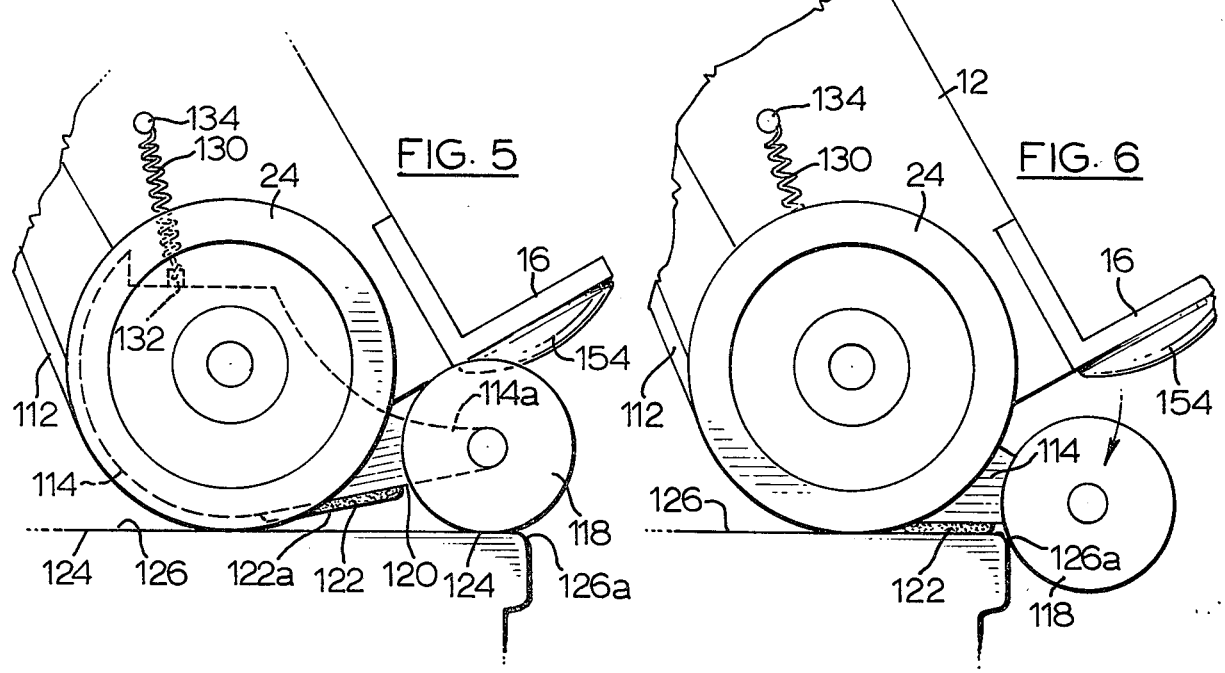

STAIR CLIMBING DEVICE

This application is a continuation-in-part of copending application Ser. No. 686,270 filed on May 14, 1976 and now abandoned.

This invention relates to a stair-climbing device adapted to transport heavy loads up and down a stairway. More particularly, the invention is related to a load-carrying stair-climbing device which incorporates an endless belt mechanism by means of which the device can be used to transverse a stairway with only a single operator to guide it.

Heavy loads such as hot water tanks and appliances are usually transported up and down stairways on hand trucks. A great deal of effort is required to accomplish the task and in cases where the load is excessive, two or more men may be required to operate the truck. In an attempt to ease the task, various self-propelled stair-climbing devices have been proposed. Many such devices incorporate endless traction mechanisms for engaging successive steps in a flight of steps for lifting and lowering the device on the steps. The advantage of such devices is that only a minimum effort is required on the operator's part.

Where a stair-climbing device is used to transport very heavy loads up and down a stairway, it is important that the operator have the device under complete control at every moment during the time of ascent or descent. Should the operator lose control at any time, the device may get away from him and cause great damage to the load being carried or to the stairway. Many of the proposed stair-climbing devices do not afford the means for such control. For example, where such devices are used to transport a load down a flight of steps, they must be correctly positioned manually at the forward edge of each step before their traction mechanism can be used to lower them to the next step. The operator of any of the devices, who stands behind it, can usually not see precisely the position of the device on the step since his vision is impaired by the load. If the operator pushes the device too far forward, it will topple over the step with resulting damage to the load and to the next lower step.

The operator of any of the stair-climbing devices described above may also lose control of it when it is used to transport a load up a flight of stairs. After the device has been deposited on each higher step by the traction mechanism, the device is free to roll on the step. Unless the operator has a firm hold on the device, it may roll forward and fall off the step. Since the operator's attention during this time is directed to operating the traction mechanism, it may be difficult for him at the same time to prevent the device from rolling on the steps.

It is an object of this invention to provide a stair-climbing device having means which, when the device is used to carry a load down a flight of steps, automatically retards the forward advance of the device when the device is in the required position for operation of the lowering mechanism. The device resists being pushed off the forward edge of the step even though the operator mistakenly attempts to do so.

Another object of the invention is to provide a device having means which, when the device is used to carry a load up a flight of steps, automatically maintains the device stationary on a step after the elevating mechanism has deposited the device on that step and thereby prevents the device from rolling forward and off the step.

A still further object of the invention is to provide a stair-climbing device which is provided with retractable wheels and which is useful for transporting heavy loads over soft ground, gravel driveways and over curbs, doorsteps and the like.

The stair-climbing device of the invention may be broadly described as comprising: a frame; wheel means rotatably mounted to support said frame; a prime mover; means operatively connected to the prime mover for engaging successive steps in a flight of steps to produce displacement of the device along the flight of steps; sensing means for detecting when said wheel means is within a predetermined distance from the forward edge of a tread of a step; and braking means activated by said sensing means to retard movement of said wheel means, said braking means being activated by said sensing means when the latter detects that said wheel means is within said predetermined distance.

The invention is described in detail below with reference to the accompanying drawings in which:

FIG. 4 is a fragmentary perspective view of the lower portion of the device;

FIGS. 5, 6 and 6a are fragmentary side elevations of the lower portion of the device showing two embodiments of the mechanism for retarding advance of the device;

FIG. 11 is a perspective view of the embodiment illustrated in FIG 10a; and

Like reference characters refer to like parts throughout the description of the drawings.

Figures 1, 2, 3:
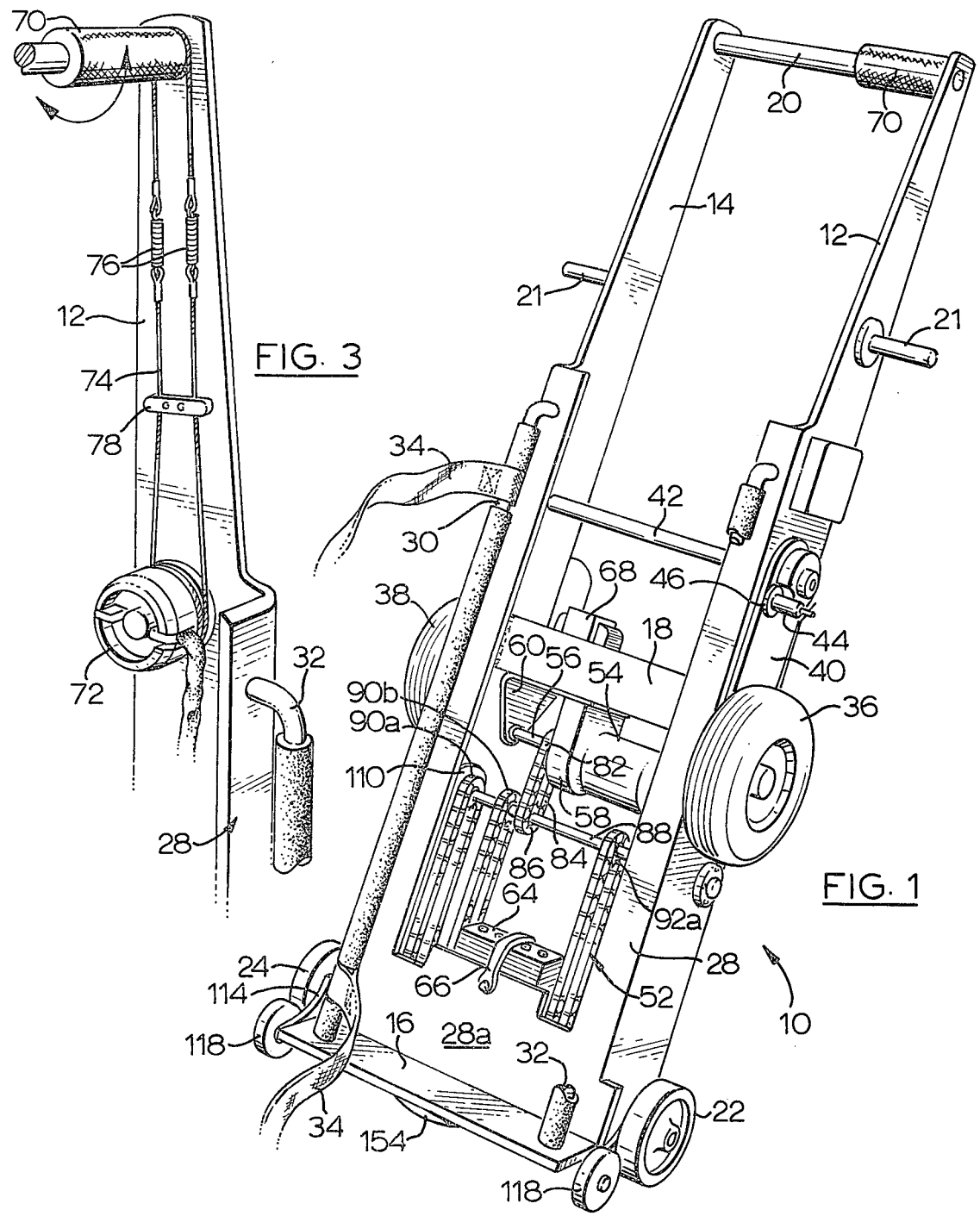
FIG. 1 is a perspective view of the stair-climbing device of the invention.
FIG. 2 is a side elevational view of the device.
FIG. 3 is a fragmentary enlarged perspective view of a side rail and handle of the device.

With reference to FIG. 1, the stair-climbing device of the invention is indicated generally 10 and comprises a pair of elongated spaced apart parallel side rails or members 12,14, a foot plate 16 and a reinforcing cross member 18. A handle 20 extends between the side rails adjacent their upper ends while an intermediate handle 21 extends outwardly from each side rail. Non-driven wheels 22,24 are mounted in bearings at the ends of short axles (not visible) which are secured to and extend outwardly from the side rails adjacent their lower ends.

Affixed to the forward side of the sides rails 12,14 is a generally U-shaped shield 28 having a lower portion 28a which protects the mechanism which raises and lowers the stair-climbing device (described below) from the load as the load is being placed on foot plate 16 or is being removed therefrom. A pair of bars 30,32 extend upwardly from opposite sides of the foot plate and are connected at their upper ends to the upper portion of shield 28. Straps 34 attached to bars 30,32 are provided for affixing the load to the device.

With reference to FIGS. 1 and 2, a pair of wheels 36,38 are provided at opposite sides of rails 12,14 to facilitate movement of the loaded device over level or inclined surfaces. Each wheel is provided with a pneumatic tire and is mounted for free rotation in bearings provided in wheel support brackets 40. The brackets are in turn mounted for rotation in bearings at opposite ends of a shaft 42.

The position of wheel 36 is locked in the inoperative position shown in FIG. 1 and in the operative position shown in FIG. 2 by means of a plunger 44 slideably accommodated within aperture 46 provided in bracket 40. A similar plunger is provided in the bracket to which wheel 38 is attached. Plunger 44 is biased inwardly by resilient means, such as tension spring (not illustrated) and when wheel 36 is in the inoperative position shown in FIG. 1, the resilient means forces the inner end of the plunger into an aperture 50 in the adjacent side rail which registers with aperture 46. In such position, the plunger maintains the bracket in the illustrated position.

To move the wheels 36,38 to the operative position, plunger 44 and the like plunger on the opposite side of the device are pulled outwardly to remove their inner ends from the apertures in the side rails. The brackets are then rotated to the position illustrated in FIG. 2 to bring the inner ends of the plungers into line with a second aperture formed in each side rail (the aperture in rail 12 being marked 48). The plungers are then released whereupon their free ends pass into the latter apertures thereby locking the brackets in position.

When the wheels 36,38 are in their operative position, the stair-climbing device may be used to transport loads over soft ground, gravel driveways and over curbs, doorsteps and the like. The wheels may be moved to their inoperative positions when the device is used to transport a load up or down a flight of steps.

With reference to FIGS. 1 and 3, the mechanism for raising and lowering the stair-climbing device on a flight of steps is indicated generally 52 and includes a prime mover 54 which imparts rotation to an output axle 56 via a gear reducer 58. The axle is mounted for rotation in bearings provided in a side bracket 60. The gear reducer is mounted on the lower surface of cross member 18 and the bracket is fastened to side rail 14. The prime mover is fastened to side rail 12 and is preferably in the form of a reversible D-C motor selectively powered by battery 64 fastened to a lower support plate (not illustrated) by strap 66 or by an external A-C source. Suitable switch means (not illustrated) is provided for selectively connecting the prime mover to one or the other of the two power sources.

The A.C. source is reduced to a suitable voltage by transformer 68 and is converted to direct current by a rectifier (not illustrated). Preferably the battery 64 is also connected to the rectifier so that the battery charges when the raising and lowering mechanism is activated by an A.C. source.

The control for the prime mover is illustrated in FIG. 3 and comprises a knurled sleeve 70 rotatable about upper handle 20 and a conventional three position switch 72 having forward and reverse positions and spring loaded to return to an intermediate off position (such as Superwinch model PM-2000). Switch 72 is connected in series with the prime mover and the power supplies. An endless cord 74 is trained about the sleeve and the switch and the cord is maintained under tension by coil springs 76. A clip 78 maintains the cord adjacent the side rail 12.

Manual rotation of sleeve 70 as iindicated by the double-headed arrow results in a change in position of the switch 72. Depending upon the position of the switch, the prime mover is caused to rotate clockwise, counterclockwise or to shut off.

With reference to FIG. 1, keyed to output axle 56 is a sprocket wheel 82 which has trained over it a sprocket chain 84 which is also trained about and imparts rotation to a driven sprocket wheel 86. The latter sprocket wheel is keyed to an upper driven shaft 88 which is disposed horizontally and is journalled in bearings secured to side rails 12,14. Two pairs of upper sprocket wheels 90a,b and 92a (and a second hidden by shield 28) are keyed to shaft 88, the pairs being disposed on opposite sides of sprocket wheel 86. Trained around each of upper sprocket wheels 90 and 92 are belts or sprocket chains 94a,b and 96a,b respectively and as illustrated in FIG. 4, the latter chains are trained about lower sprocket wheels 98a,b 100 (and a wheel hidden by side rail 14 in FIG. 4) respectively. The lower sprocket wheels are all rotatably mounted to a lower shaft 102 and are vertically aligned with the upper sprocket wheels about which the same sprocket chains are trained.

With reference to FIG. 4, a triangular-shaped bracket 104 is secured to links at the same elevation of each of the four sprocket chains 94,96. Adjacent the outer edge of each bracket 104 an aperture 106 is formed for receipt of a pin 107 which projects outwardly from each side of a triangular-shaped, load-bearing shoe 108. As illustrated, one shoe is disposed between each pair of adjacent brackets 104. Preferably each sprocket chain 94,96 is provided withat least two brackets 104 spaced 180° apart on the chain. The chains are thus provided with two sets of load-bearing shoes 108.

The aperture 106 formed in each bracket is larger in cross-section than the pin 107 accommodated therein so that the shoe may rotate freely in the bracket. The pins of each shoe are located adjacent an apex of the pin to ensure that the flat lower side 108a of the shoe opposite the apex lies horizontally by force of gravity when the shoe is travelling in the vertical reaches of the sprocket chains and when it is travelling around the lower sprockets wheels 98,100. It is unnecessary that the flat side 108a be similarly oriented when the shoes are passing around upper sprocket wheels 90,92 and hence the brackets 104 to which the shoes are attached need not be constructed to allow the shoes to rotate freely when the shoes are so located.

A sheave 110 is rotatably mounted to upper shaft 88 adjacent side rail 14 and a like sheave (hidden by shield 28) is also rotatably mounted to shaft 88 adjacent side rail 12. Vertically aligned with these sheaves is a pair of like sheaves rotatably mounted to lower shaft 102. A belt 112, composed of rubber or similar relatively soft material, is trained about each pair of vertically aligned sheaves. The sheaves are of sufficiently large diameter than the belts project beyond the side edges and lower edges of side rails 12,14 and thereby serve as guards against damage to stairs being traversed by the stair-climbing device.

The stair-climbing device is equipped with sensing means in the form of arms 114,116 which are rotatably mounted to the axles upon which wheels 24,22 respectively revolve. The arms are of like construction and hence the structure and operation of only one arm (114) will be described. Arm 114 tapers forward of wheel 24 and terminates at a rounded forward end portion 114a to which a sensing head 118 is attached. As shown, the sensing head is in the form of a roller journalled in bearings in the arm end portion 114a.

Arm 114 is provided with a flat lower surface 120 to which is affixed braking means in the form of a friction plate 122. The lower surface 122a of the friction plate has a relatively high coefficient of friction and is preferably disposed on arm 114 such that as the arm rotates, the lower friction surface 122a revolves in the same vertical plane as an imaginary line (marked 124—124) which revolves about the lowermost point on the circumference of wheel 24.

While the sensing head 118 is in contact with tread 126 upon which the wheel 24 is rolling, the head maintains the lower friction surface 122a above and out of contact with the tread. When the sensing head is beyond the forward edge 126a of the tread, as depicted in FIG. 6, the arm 114 rotates downward about the wheel axle until the friction surface contacts the stair tread. Where the lower friction surface is disposed according to the preferred embodiment described above, its entire area will contact the tread.

Resilient means in the form of a coil tension spring 130 is attached at one end to a lug 132 on the upper side of the arm and the upper end of the spring is fastened to a pin 134 attached to the side rail. The spring urges the arm to pivot clockwise and hence serves to bias the sensing head 114 downwardly and, as illustrated in FIG 6, to cause the friction surface 122a to move into contact with the tread when the sensing head is beyond the forward edge of the tread.

With reference to FIG. 6a, a bifurcated braking member 136 is pivotally connected at 138 to arm 140 between sensing head 142 and wheel 24a. The braking member comprises a lower limb 136a having an intermediate head 146 adapted to contact stair tread 147 and an upper limb 136b having braking means in the form of a braking shoe 150 conforming in shape to the periphery of wheel 24a and disposed in apposition thereto.

Braking member 136 may be provided in lieu of the friction pad 122 illustrated in FIGS. 5 and 6 or it may be provided on the arm in addition to the friction pad.

The operation of the stair-climbing device is explained with reference to FIGS. 5 to 9. With reference first to FIGS. 5 and 6, the arm and sensing head therein illustrated are usefully employed when the device is used to carry a load down a flight of steps. In such a case, the operator will be standing behind the stair-climbing device on a higher step than the one on which the device rests and he will be gripping upper handle 20 or intermediate handles 21.

The operator's vision of the wheels 22,24 will, in most cases, be blocked by the load carried by the device and he will be unable to see how close the wheels are to the front edge of the stair tread. By means of the arm and sensing head, however, he will be able to detect when the wheels are adjacent the front edge. The reason is that when he pushes the device from the rear, it will roll on the wheels toward the forward edge 126a of the tread until the sensing head 118 (and the like head at the opposite side of the device) is beyond the edge. The heads will thereupon drop and the friction surfaces 122a will descend into contact with the tread. Once contact is made, the friction surfaces impede or halt further forward movement of the device and the operator will know that the lowering mechanism must be activated.

When the stair-climbing device is equipped with the braking assembly illustrated in FIG. 6a, positive braking force is applied to wheel 24a when the sensing head 142 is beyond the forward edge of the stair tread. This is because when the head is beyond the forward edge, it causes the arm 140 to rotate clockwise downwardly. As the arm rotates, the intermediate head 146 is caused to move upward relative to the arm and the braking shoe 150 pivots into positive contact with the periphery of the wheel.

When further forward movement of the stair-climbing assembly is halted by the friction surface 122a and/or by the braking member 136 of FIG. 6a, the lowering mechanism described above is activated. The mechanism is activated by rotating the sleeve 70 on the upper handle to cause the prime mover to rotate the sprocket chains clockwise in the direction of the arrow in FIg. 7.

Figure 8:
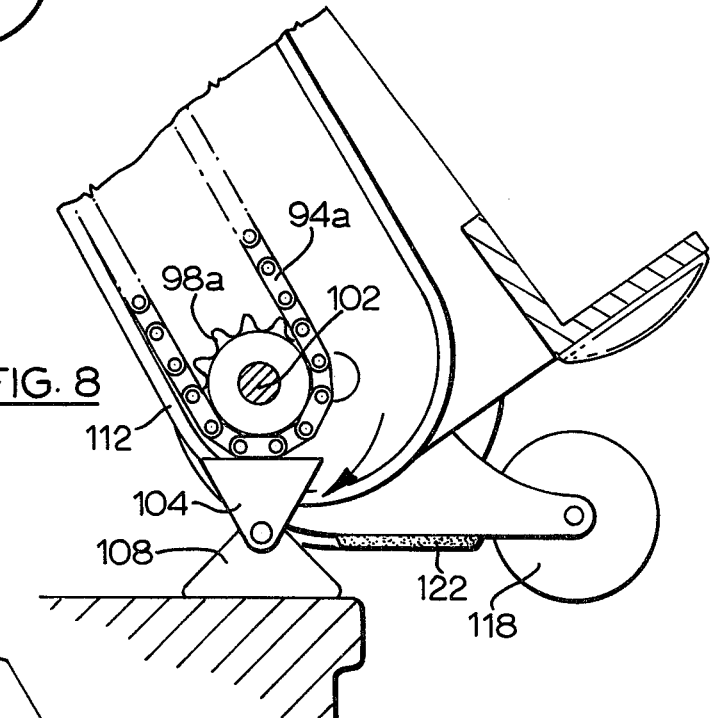
Figure 9:
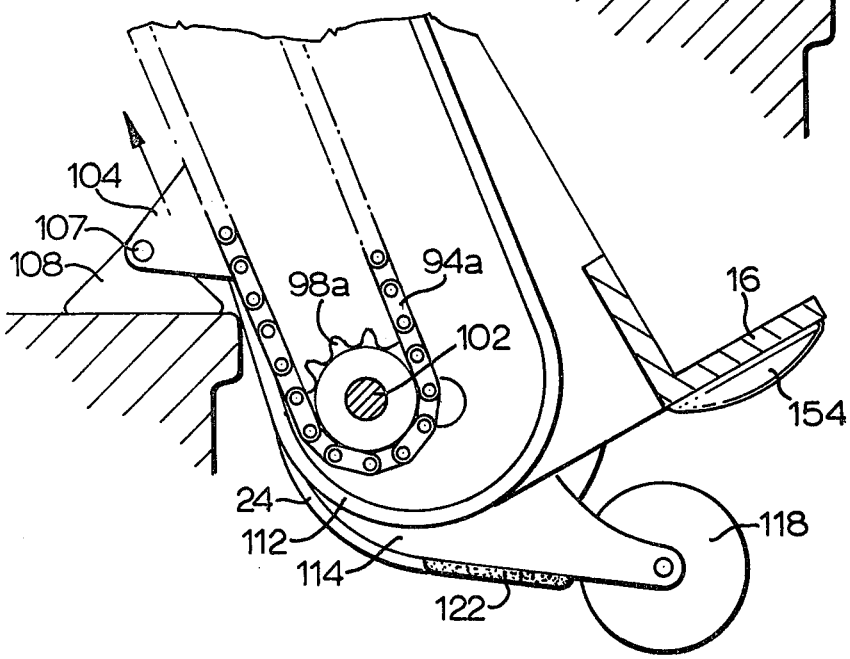

As sprocket chain 94a in FIG. 7 rotates, the load-bearing shoe 108 descends from the right of lower sprocket wheel 98a and when its lower surface is below the lowermost edge of the wheel 24, the shoe elevates the stair-climbing device above the stair tread. As the shoe continues to rotate about the lower sprocket wheel, the stair-climbing device is elevated and is moved horizontally forward, as shown in FIG. 8. When the shoe is in the upwardly moving reach of the sprocket chain as shown in FIG. 9, wheel 24 has cleared the forward edge of the stair tread and the stair-climbing device descends as the shoe continues in its upward path toward the upper sprocket wheel.

As the shoe moves upwardly, arm 114 hangs freely, balanced at approximately 45° from a horizontal position. When the sensing head 118 touches the tread of the next lower step, it raises the arm and the arm remains elevated until the sensing head again falls over the forward edge of the next step.

When the wheels 22,24 contact the next lower step in succession, the weight of the loaded stair-climbing device transfers to the wheels from the shoes. The sprocket chains should be rotated further clockwise to lift the shoes off the stair tread so that the shoes will not prevent the device from being moved forward. The device is then manually rolled forward on the stair tread until the sensing head drops downward in the manner described before and the lowering mechanism is again activated.

Should the stair-climbing device be used to carry a load up a flight of steps, the device is rolled backward toward the lowermost step until the belts 112 at the rear side of the device contact the forward edge of the next higher step in succession. The prime mover is then activated to cause the sprocket chains 94,96 to rotate counterclockwise and thereby cause the two adjacent load-carrying shoes above and closest to the next higher step to descend into contact with the tread of that step. The shoes being pivotally connected to the sprocket chain will rock upon contact with the tread until their entire lower surfaces are in contact with the tread. Further counterclockwise rotation of the sprocket chains will result in elevation of the device by the shoes.

When the device ascends to the step on which the lifting shoes are resting, as shown in FIG. 8, the shoes will be adjacent the lower sprocket wheels 98,100. As the shoes rotate about the sprocket wheels, the stair-climbing device will be drawn horizontally rearwardly to the position shown in FIG. 7. Subsequently, as the shoes begin to ascend on the upwardly travelling reaches of the sprocket chains, the wheels 22,24 of the device will be deposited on the tread.

Figure 7:
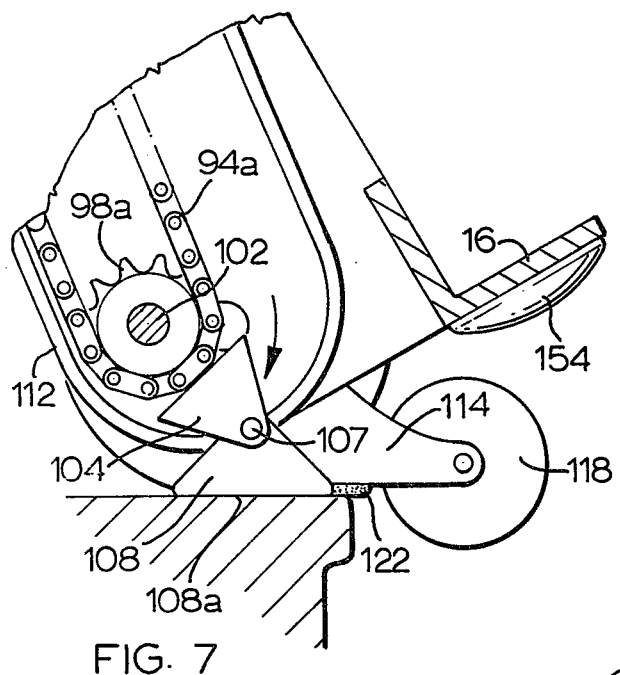
FIGS. 7, 8 and 9 are fragmentary side elevations of the lower portion of the device showing the operation of the elevating and lowering mechanism.

When the device is in the position shown in FIG. 7, the friction pad 122 and/or the braking shoe 150 will prevent the device from rolling toward the forward edge of the stair tread. By manually rolling the device backward toward the next higher step, the sensing head will roll up and over the forward edge of the step thus lifting the friction pad and/or causing the brake shoe to separate from the wheel 24. Thus the loaded assembly will be under control during the entire ascent of a flight of stairs.

The horizontal movement of the stair-climbing device brought about by the shoes as they rotate about the lower sprocket wheels must be sufficient to displace the device from a position in which its wheels are squarely on a tread (as depicted in FIG. 7) to a position in which the device clears the tread (as depicted in FIG. 9). The extent of horizontal displacement of the device will depend upon the diameter of the lower sprocket wheels and the offset of the load-bearing shoes 108 from the sprocket chains 94,96. By correct choice of sprocket wheel diameter and dimension of brackets 104, the stair-climbing device will be displaced the required distance as the shoe rotates about the lower sprocket wheels.

Figure 10:
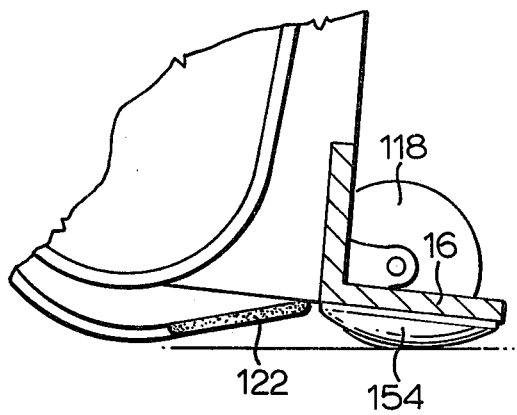
FIG. 10 is a fragmentary side elevation of another embodiment of the lower portion of the device.

With reference to FIG 10, a frusto-spherical pad 154 is provided beneath and midway between the side edges of foot plate 16. The pad is composed of strong, tough material having a relatively low coefficient of friction. The pad is provided to facilitate rotation of the loaded stair-climbing device about a generally vertical axis. The pad is particularly useful where the direction of movement of the device must be changed in a confined space such as on a landing or in a tight corner. To make use of the pad, the side rails 12,14 of the device are tilted upward until they are substantially vertical. The device will then be resting wholly on the pad and may be easily rotated about a vertical axis until it is correctly positioned for further movement.

Figure 10A:
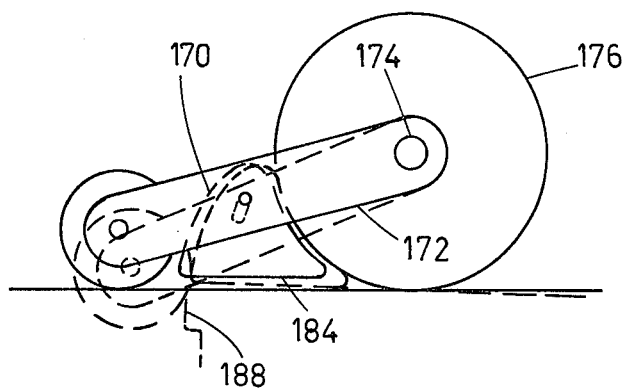
FIG. 10a is a fragmentary side elevation of a still further embodiment of the lower portion of the device.
Figure 11:
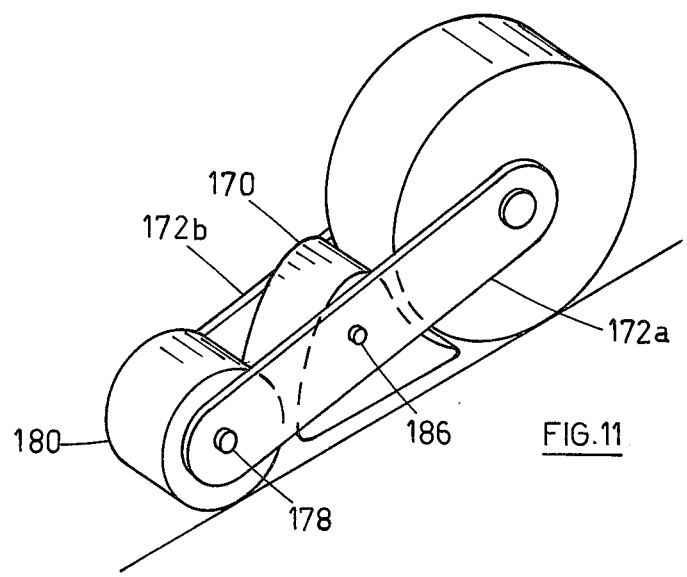
Figure 12:
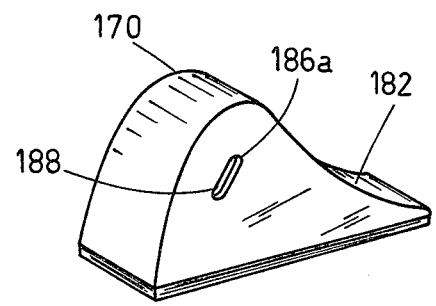
FIG. 12 is a perspective view of one component of the embodiment illustrated in FIGS. 10a and 11

An alternative embodiment for retarding the advance of the stair-climbing device is illustrated in FIGS. 10a, 11 and 12. With reference first to FIG. 10a, a wedge-shaped braking member 170 is disposed between parallel and spaced apart rocker arms 172a,b. To one end of each arm is journalled the lower shaft 174 of wheel 176 while to the opposite end of each arm is journalled the axle 178 of sensing head 180. The rocker arms are free to rock with respect to both wheel 176 and to sensing head 180.

Braking member 170 is triangular in shape and is provided with a curved upper wall 182 (FIG. 12) which is adjacent wheel 176 and which conforms in shape to the curvature of the wheel. The braking member is provided with a flat lower surface 184 which, like the friction plate affixed to arm 114 in the embodiment illustrated in FIGS. 5 and 6, has a relatively high co-efficient of friction so that it resists sliding movement across a stair tread. Preferably the braking member is composed of rubber or relatively hard polymeric material.

A pin 186 is affixed to each rocker arm. The pin extends between the two arms through slot 188 formed in the upper portion of the braking member 170. The slot extends from an upper wall 186a in a direction downwardly and away from curved wall 182. The pin is moveable laterally within the slot and the braking member is, as a result, free to rock or oscillate with respect to the rocker arms.

The operation of the braking member is described with reference to FIG. 10a. While the sensing head 180 is in contact with the tread upon which wheel 176 is rolling, the pin 186 contacts the upper wall 186a of the slot and suspends the braking member above the stair tread. When the sensing head is beyond the forward edge 188 of the tread, the rocker arms rotate downwardly, as illustrated in broken lines in the figure. As the arms rotate, pin 186 moves downwardly in slot 188 and braking member 170 descends to the position shown in broken lines in the figure where its lower friction surface 184 contacts the tread. Once the lower surface is in contact with the tread, the surface impeds or halts movement of the braking member toward the forward edge 188 of the tread.

The braking member, once its forward movement is halted, checks further forward movement of the wheel since such movement necessitates the rolling upward of the wheel on upper wall 182. As the wheel rolls up the wall, it is pulled into closer and closer contact with the wall by pin 186 which moves downwardly and outwardly of the wall in slot 188. Eventually friction between the wheel and the upper wall becomes so great that further upward movement of the wheel becomes impossible. Reverse movement of the wheel is possible of course since such movement tends to reduce the braking effect of member 170 on the wheel.

It will be understood, of course, that modifications can be made in the preferred embodiments of the invention described and illustrated herein without departing from the scope and purview of the invention as defined in the appended claims. For example the stair climbing device may be provided with safety devices in addition to the sensing means described above to ensure safe ascent and descent on a flight of stairs. One such safety device may be a mercury switch attached to arm 114 and connected electrically in series with prime mover 54. The mercury switch is arranged on the arm such that it is closed when the friction surface 122 is in a generally horizontal position but is open when arm 114 is tilted upward. As the stair climbing device descends each step in a flight of steps, the switch does not close until the sensing head has cleared that step. The switch thus prevents premature activation of the lowering mechanism and ensures that the device is properly positioned on each step before the lowering mechanism can be activated.

What I claim as new and desire to protect by Letters Patent of the United States is:

1. A stair-climbing device comprising: a frame; wheel means rotatably mounted to support said frame; a prime mover; means operatively connected to the prime mover for engaging successive steps in a flight of steps to produce displacement of the device along the flight of steps; and arm means pivotally connected to the frame and having a downwardly extending sensing head disposed forward of the wheel means, said sensing head, as the wheel means rolls forward on a tread of a step toward the forward edge thereof, being adapted to contact said tread until said sensing head is beyond said forward edge whereuon said sensing head descends with resulting pivotal movement of said arm means, said arm means further having a downwardly facing friction surface disposed to the rear of said sensing head, said surface being spaced above said tread when said sensing head is in contact therewith and descending into contact with said tread upon said pivotal arm movement to frictionally retard further forward movement of said wheel means.

2. The stair-climbing device as claimed in claim 1 further including a braking member pivotally connected to said arm means, said braking member having a head disposed to the rear of said sensing head and adapted to contact said tread, said braking member further having a braking shoe spaced apart from said wheel means when said sensing head contacts said tread, said arm means upon pivotal movement thereof, moving downward relative to said braking member head with resulting pivotal movement of said braking shoe into contact with said wheel means to further frictionally retard forward movement thereof.

3. The stair-climbing device as claimed in claim 1 wherein said sensing head is in the form of a roller.

4. The stair-climbing device as claimed in claim 1, wherein said frame includes a pair of spaced elongated members at the sides thereof, said device further including: lower and upper sheaves rotatably mounted to each of said elongated members; a belt trained about said lower and upper sheaves, said belt projecting beyond rear and lower edges of said elongated member and thereby serving as a guard against damage to steps being traversed by said device.

5. The stair-climbing device as claimed in claim 1, wherein said frame includes a foot member adjacent the lower end thereof and upon which a load to be carried by said device may rest, said device further including a pad provided beneath and midway of opposite facing side edges of said foot member, said pad having a relatively smooth outer surface and adapted to facilitate manual rotation of the device about a generally vertical axis.

6. The stair-climbing device as claimed in claim 1 wherein said friction surface is disposed on said arm means such that as said arm means pivots, said friction surface revolves in the same vertical plane as an imaginary line which revolves about the lowermost point on the circumference of said wheel means.

7. The stair-climbing device as claimed in claim 1, further including resilient means operatively connected to said arm to bias said sensing head downward.

8. The stair-climbing device as claimed in claim 1 further including switch means connected to said arm means and electrically connected to said prime mover, said switch means being arranged to be open when said friction surface is spaced above a tread upon which said wheel means are disposed to prevent activation of said prime mover, said switch means being closed when said friction surface is in contact with said latter tread to permit activation of said prime mover.

9. A stair-climbing device comprising: a frame; wheel means rotatably mounted to support said frame; a prime mover; means operatively connected to the prime mover for engaging successive steps in a flight of steps to produce displacement of the device along the flight of steps; and arm means pivotally connected to the frame and having a downwardly extending sensing head disposed forward of the wheel means, said sensing head, as the wheel means rolls forward on a tread of a step toward the forward edge thereof, being adapted to contact said tread until said sensing head is beyond said forward edge whereupon said sensing head descends with resulting pivotal movement of said arm means, said arm means further having a braking member pivotally connected thereto, said braking member having a head disposed to the rear of said sensing head and adapted to contact said tread, said braking member further having a braking shoe spaced apart from said wheel means when said sensing head contacts said tread, said arm means, upon pivotal arm movement thereof, moving downward relative to said braking member head with resulting pivotal movement of said braking shoe into contact with said wheel means to frictionally retard further forward movement thereof.

10. A stair-climbing device comprising: a frame; wheel means rotatably mounted to support said frame; a prime mover; means operatively connected to the prime mover for engaging successive steps in a flight of steps to produce displacement of the device along the flight of steps; and arm means pivotal with respect to the frame and having a downwardly extending sensing head disposed forward of the wheel means, said sensing head, as the wheel means rolls forward on a tread of a step toward the forward edge thereof, being adapted to contact said tread until said sensing head is beyond said forward edge whereupon said sensing head descends with resulting pivotal movement of said arm means; a braking member disposed to the rear of said sensing head and having an upper wall in apposition to said wheel means and a downwardly facing friction surface which descends into contact with said tread upon said pivotal arm movement to frictionally retard forward movement of said braking member, said upper wall contacting said wheel means when said braking member is so retarded and retarding further forward movement thereof.

11. A stair-climbing device comprising: a frame; wheel means rotatably mounted to support said frame; a prime mover; means operatively connected to the prime mover for engaging successive steps in a flight of steps to produce displacement of the device along the flight of steps;
arm means pivotal with respect to the frame and having a downwardly extending sensing head disposed forward of the wheel means, said sensing head, as the wheel means rolls forward on a tread of a step toward the forward edge thereof, being adapted to contact said tread until said sensing head is beyond said forward edge whereupon said sensing head descends with resulting pivotal movement of said arm means; a braking member disposed to the rear of said sensing head having a downwardly facing friction surface and a curved upper wall which is adjacent said wheel means and which conforms in shape to the curvature of the area of said wheel means adjacent thereto, said curved wall and said friction surface, upon said pivotal arm movement, moving into contact with said wheel means and said tread respectively to frictionally retard further forward movement of said wheel means.

12. The stair-climbing device as claimed in claim 11 wherein said braking member is slideably connected to said arm by means of a pin connected to said arm and passing through a slot formed in said braking member, said slot being relatively elongated and extending from an upper wall downwardly and outwardly of said curved wall, said pin passing downwardly in said slot upon contact of said friction surface with said tread with resulting movement of said wheel means into contact with said curved surface.

* * * * *